United States Patent [19]
O'Neill

[11] 4,098,560
[45] Jul. 4, 1978

[54] FUEL INJECTION PUMPS FOR INTERNAL COMBUSTION ENGINES

[75] Inventor: Cormac G. O'Neill, Lafayette, Calif.

[73] Assignee: Physics International Company, San Leandro, Calif.

[21] Appl. No.: 642,768

[22] Filed: Dec. 22, 1975

Related U.S. Application Data

[63] Continuation-in-part of Ser. No. 481,666, Jun. 21, 1974, Pat. No. 3,927,652.

[51] Int. Cl.² ............. F04B 17/00; F04B 35/00; F16J 1/10
[52] U.S. Cl. ................... 417/214; 417/380; 417/399; 417/401; 123/139 AU; 92/62; 92/84
[58] Field of Search ............ 417/398, 399, 400, 401, 417/214, 380; 92/84; 91/170 R; 123/139 AJ, 139 AE

[56] References Cited

U.S. PATENT DOCUMENTS

| | | | |
|---|---|---|---|
| 1,376,277 | 4/1921 | Higgins | 123/139 AJ |
| 1,520,852 | 12/1924 | Cable | 92/62 |
| 1,981,667 | 11/1934 | Rockwell | 92/84 |
| 2,064,750 | 12/1936 | Hurst | 417/214 |
| 3,769,879 | 11/1973 | Lofquist | 92/84 |

*Primary Examiner*—Carlton R. Croyle
*Assistant Examiner*—Thomas I. Ross
*Attorney, Agent, or Firm*—Lindenberg, Freilich, Hornbaker, Wasserman, Rosen & Fernandez

[57] ABSTRACT

A fuel injection system for an internal combustion engine is described, which provides for independent, flexible control of timing as well as quantity of fuel injected. The system is programmable for torque shaping and adaptable to a wide range of engine sizes. It uses piezoelectric valves for controlling injection timing, a shuttle, fuel meter and a gas driven high pressure pump for injecting the fuel into the cylinders.

11 Claims, 9 Drawing Figures

FUEL INJECTION PUMPS FOR INTERNAL COMBUSTION ENGINES

ORIGIN OF THE INVENTION

This application is a continuation-in-part of application Ser. No. 481,666, which was filed on June 21, 1974, which is entitled Fuel Injection System For Internal Combustion Engines, and is now U.S. Pat. No. 3,927,652.

BACKGROUND OF THE INVENTION

This invention relates to fuel injection systems for internal combustion engines, and more particularly to improvements therein.

In the operation of medium and high-speed compression-ignition engines, a compromise is always made between economy, smoke, peak cylinder pressure and more recently, emissions. The fuel injection system appears to be the factor which has the most significant influence on these variables, since limitations in its capabilities set practical boundaries to the choice of operational parameters.

It has been demonstrated that both speed and load influence ideal injection timing. Of the few conventional injection systems that provide timing adjustment, speed control advance is more commonly chosen. A few systems provide speed and load advance, but the mechanism required is heavy, complex and expensive. When unit pump/injectors—driven by a cam, push rod and rocker from the engine camshaft—are employed, it is not practical to have controlled timing adjustment. Uncontrolled timing variations occur in some of these systems as the fueling is altered.

Control of the combustion by injection timing and/or rate is always attempted in engine development. For example, injection timing is adjusted to hold peak cylinder pressure within design limits. However, the employment of a programmed, non-uniform injection rate can be shown to reduce peak cylinder pressure without significantly influencing economy. A complete investigation of this mode of combustion control has been prevented because conventional injection systems lack the flexibility to achieve rapid changes in injection rate. Furthermore, since they derive injection energy directly from the crankshaft at the time injection is taking place, the entire energy transfer takes place over a small crankshaft angle and very high forces or torques are involved. Consequently, mechanical drives must be rugged and the requirement for variable timing becomes more difficult to satisfy. Torsional impulses are returned to the crankshaft, increasing engine roughness and placing greater demands upon the torsional vibration damper.

Fuels of varying cetane value and specific gravity generally require different injection timings for optimum combustion. The extent of the timing change required for a range of fuels is greatly dependent upon the engine's design, but frequently the injection timing cannot be maintained at optimum by a single step adjustment. Existing injection systems can be provided with several alternative timing points. Changes in fuel type can be accommodated by manually selecting the appropriate setting of the pump coupling to give a compromise timing curve. However, at some speeds and and loads, losses in combustion efficiency occur.

Mechanically controlled injection introduces a programmed maximum fuel vs. speed characteristic by the complicated interaction of dynamic hydraulic effects. Adjustments of the fuel pipe unloading volume, pipe size, nozzle characteristics, pump element diameter, and pump cam are made during development to achieve the torque shaping desired for the particular vehicle or application. Subsequent change in the desired torque curve requires partial or complete rebuild of the fuel injection equipment. Similarly, with speed-governing, changes in the governed speed, tolerable "runout" or "all speed" characteristics demand a mechanical rebuild.

This lack of flexibility in the control of mechanical systems requires a large inventory of spare parts or replacement fuel injection equipment sets and tends to prevent the adaptability of complete rebuilt engines to a variety of vehicle installations.

OBJECTS AND SUMMARY OF THE INVENTION

An object of this invention is to provide a fuel injection system which is adaptable to a wide range of engine sizes.

Another object of this invention is to provide a fuel injection system which has readily reprogrammable torque shaping and governing characteristics, and which requires only low torque drives from the engine.

Still a further object of this invention is the provision of a fuel injection system wherein injection timing is programmable with speed and load.

Yet another object of this invention is the provision of a fuel injection system which can be used for fueling engines with wide injection pressure requirements.

Yet another object of the invention is to provide extremely high injection pressure and to relieve pressure entirely on the nozzle valve in between injections to avoid critical dependence upon sealing and condition of nozzle valve.

These and other objects of the invention are achieved in a system wherein fuel is metered, from a central metering unit, to the appropriate cylinder, where it is stored by a structure in the injection valve until the crankshaft achieves the angle desired for injection. The fuel is metered at low pressure, to satisfy operator demands within limitations of smoke, torque shaping, speed governing or emission requirements.

When the crankshaft reaches the angle desired for injection, an electroexpansive pump drives open an injection control valve or successively drives open a pilot and then a main injection control valve whereby pressure from a gas-driven high pressure pump can apply sufficient pressure to the stored fuel to open an injection nozzle which is maintained closed by fuel at high pressure from the gas pump. This enables the fuel to be injected into the cylinder either for a single main injection or for a successive pilot and then main injection.

In a U.S. Pat. No. 3,587,547 there is described a fuel injection system wherein the pressure of a metered quantity of fuel to be injected into a cylinder is raised when the time for fuel injection arises, until it can overcome the mechanical biasing force applied to an injection valve. The present invention also raises the pressure of a metered quantity of fuel at fuel injection time, but the force that must be overcome to open the injection valve is applied to the valve from the same high pressure pump whose output is being used to boost the metered fuel pressure. Thus, the effect of pressure variations on the quantity of fuel to be delivered is eliminated with the present invention since, if the pressure output from the high pressure pump varies the pressure on the metered quantity of fuel and the pressure holding the injection nozzle closed vary correspondingly. This is not the case with a mechanically closed injection nozzle, as is found in the patent. Further, the present invention provides for pilot fuel injection, which is not found or provided for in the patented fuel injection system.

The novel features of the invention are set forth with particularity in the appended claims. The invention will best be understood from the following description when read in conjunction with the accompanying drawings.

DESCRIPTION OF THE EMBODIMENT OF THE INVENTION

Figure 1:
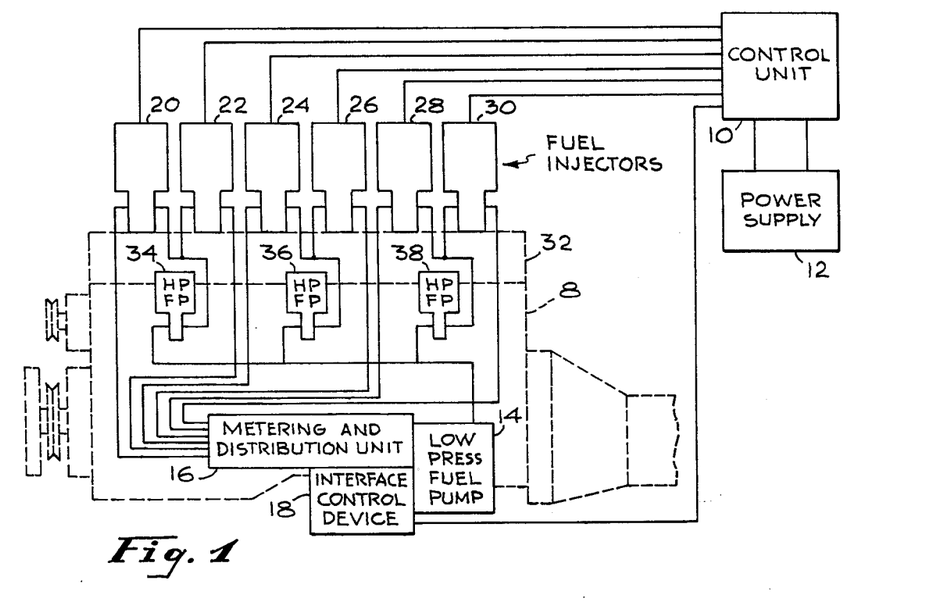
FIG. 1 is a schematic drawing illustrating a six-cylinder engine with the accompanying fuel injection system, in accordance with this invention.

Referring now to FIG. 1, there may be seen a schematic arrangement for a fuel injection system, for an internal combustion engine 32, in accordance with this invention. Electrical controls for the fuel injection system, including the operator control, are contained in a control unit 10 for which a power supply 12 is provided. A low pressure fuel pump 14, which is of conventional design, preferably of positive displacement gear pattern, draws fuel from the fuel storage tank, not shown, and raises it to a suitable pressure, such as about seven bars. The fuel at low pressure is then fed to a metering and distribution unit 16.

The metering is performed in a unit that partitions discrete injection volumes of fuel under the control of an interface control unit 18, and the metering and distribution unit 16 distributes the metered volume of fuel to the respective fuel injectors 20, 22, 24, 26, 28 and 30. There the fuel injectors store the metered quantity of fuel until the crankshaft reaches an angle at which the fuel injectors are actuated to inject fuel into the respective cylinders of the engine 32.

The control unit 10 provides a signal to the interface control unit 18 in accordance with operator demand within limitation of smoke, torque shaping, speed governing and/or emission requirements. The interface control unit operates with a position transducer, not shown here, to insure that a proper quantity of fuel is metered in response to the signal received from the control unit. The control unit also provides triggering signals to the respective fuel injectors 20, through 30, in response to camshaft position.

A high pressure fuel pump respectively 34, 36, 38, is provided for each two fuel injectors. While conventional high pressure fuel pumps may be employed without any major effect upon the function of the remainder of the system, because of the high tolerance machining and heavy drives which would be required to provide pressures on the order of 320 bars, in accordance with this invention, a novel high pressure pump is proposed which is gas operated. Each pump is directly connected to the combustion chamber of a different cylinder for obtaining the gas required for its operation. The high pressure fuel pumps receive fuel from the low pressure fuel pump, amplify the fuel pressure, and supply the fuel to the respective fuel injectors. The fuel injection nozzle valves are maintained closed by pressure applied by fuel from the high pressure pumps. The fuel under high pressure from the high pressure pumps is also used by each of the fuel injectors to boost the pressure of the fuel received from the metering and distribution unit and stored by the fuel injector so that the boosted fuel pressure overcomes the high fuel pressure biasing the nozzle valve closed and opens the injection valve permitting the stored fuel to be injected into a cylinder at the boosted pressure.

Figure 2:
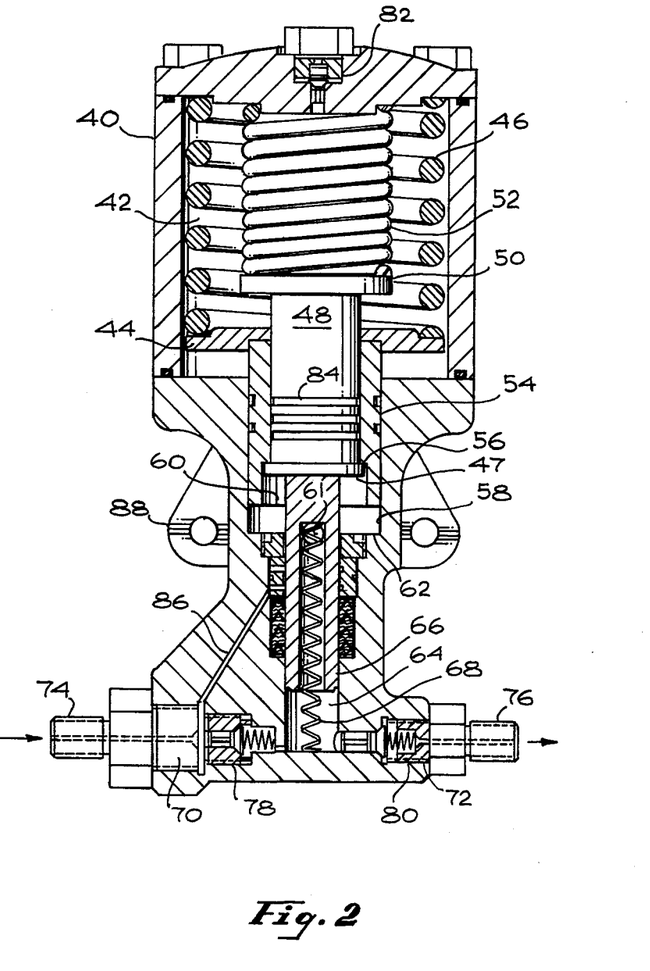
FIG. 2 is a view in section of a high pressure gas-driven fuel pump, in accordance with this invention.

FIG. 2 is a view in section of the high pressure gas-driven fuel pump. The high pressure fuel pump comprises a housing 40 which, in its upper section, comprises a chamber 42 within which there is a spring seating 44 centrally positioned by a spring 46, which urges the seating downward. At the top of the chamber is a gas leakage valve 82, which is preset so that it will permit gas to leak out of the chamber when the pressure therein exceeds a predetermined value.

A piston 48 is provided with a collar 47 at one end and carries a disc 50 on its upper extremity. An annular piston 54, surrounds the smaller piston 48. This annular piston 54 has a land 56 therein which can be engaged by the collar 47 on piston 48 when it is lifted to the position shown. The lower end of the annular piston 54 is exposed to gas pressure and forms a movable boundary to a chamber 60. The lower end of piston 48 forms another moveable boundary to chamber 60. Gas is applied to the chamber 60 from a gas intake opening 61, which connects by a passage (not shown) to an engine cylinder. The upper end of the annular piston 54 engages the spring seating 44.

The housing walls 58 define the fixed walls of chamber 60. The housing 40 lower walls also form a fuel chamber 64. A fuel plunger 66 has a central hollow portion within which a spring 68 is inserted to bias the fuel plunger upwardly against the disc 47 and piston 48. Thus, when the piston 48 moves upwardly, the fuel plunger will move upwardly therewith in response to the bias of its spring 68.

Formed within the housing walls is an inlet passage 70, leading to the fuel chamber 64, and an outlet passage 72 leading from the fuel chamber. The inlet passage is connected through suitable fittings 74 to the low pressure fuel pump. The outlet passage 72 is connected through a suitable fitting 76 to the two fuel injectors which it services.

Within the inlet passage in an inlet check valve 78. Within the outlet passage is an outlet check valve 80.

When the pump is not operating, the piston 48 is pushed by the inner spring 52 until it abuts the lower extremity of chamber 60, whereby it pushes the fuel plunger 66 downwardly. The inner spring 52 provides a preload on the piston 48, which is slightly lower than the gas load at starting compression ratio without firing. When the engine is running, gas pressure into the chamber 60 forces the piston 48 upwards compressing the inner spring 52 and also forces the annular piston 54 upwards compressing spring 46 and enabling the fuel plunger 66 to rise, whereby fuel will be received from the low pressure fuel pump 14, passing through the check valve 78 into the fuel chamber 64.

As engine gas pressure falls, the spring 52 exerts pressure on the piston 47 and spring 46 exerts pressure on piston 54 thereby pushing the fuel plunger 66 downwardly. This causes the check valve 78 to close and increases the pressure on the fuel in the fuel chamber, sufficiently to open the check valve 80. Fuel injection pressure to enable the engine to be started is achieved by fitting the smaller piston 48 within the annular piston 54. The pressure available for starting is lower than when the engine is firing but since cranking speed is low, the lower pressure more accurately matches requirements, effectively prolonging injection until the engine is close to top dead center. The spring 52 is designed to provide a 76-bar fuel pressure, for example, when lifted a distance of 12 mm. At this lift, the starting gas piston 48 reaches the position shown in the drawing, which is the limit of its travel, and can only lift further if the annular piston 54 is also lifted. As the engine fires, higher gas pressures are available and higher injection pressures are desired, the smaller piston 48 will cause the annular piston 54 to push the spring seating 44 until it moves upward, thus compressing the outer spring 46. When the gas pressure in the engine cylinder, due to the power stroke of the piston reduces, a desirable higher pressure is provided by both springs for application to fuel in the fuel chamber 64.

The sizes of the inner and outer springs which are required to return the fuel plunger 66 are reduced by utilizing a "gas spring." This "gas spring" is designed to contribute about 60% of the total load. The "gas spring" comprises using gas under pressure in the chamber 42 above the pistons 54 and 48, which acts in the direction to assist the expansion of springs 52 and 46.

There is compensation provided for temperature changes in the chamber 42, without which wide fuel injection pressure variations would result, as for example from a temperature increase through a maximum of 300° F. That is the purpose of the pressure relief valve 82, which is at the top of the chamber 42. By way of example, the pressure relief valve is designed to lift at 29 bars, i.e., 10% higher than the nominal compressed maximum pressure. This increase will produce a 6% increase in fuel injection pressure, or about 3% increase in the rate of fuel injection. When the engine is stopped, pressure on the chamber tends to fall due to leakage between piston 54 and housing 58. When the engine is cranked to restart, injection pressure is lower, a more desirable condition, to avoid over-penetration of the engine chamber at minimum swirl velocity, and to avoid excessive wall deposition. However, as soon as the engine starts firing, gas pressure, in the chamber 42, due to seepage of gas past the grooves 84, for example, rises once again to the 29-bar figure, restoring the injection rate to normal.

A passageway 86 collects any fuel that leaks past the fuel plunger 66, and returns it to the inlet passageway 70. The high pressure pump is fitted with suitable lugs 88 whereby it may be mounted directly on the engine cylinder head.

Figures 3, 4:
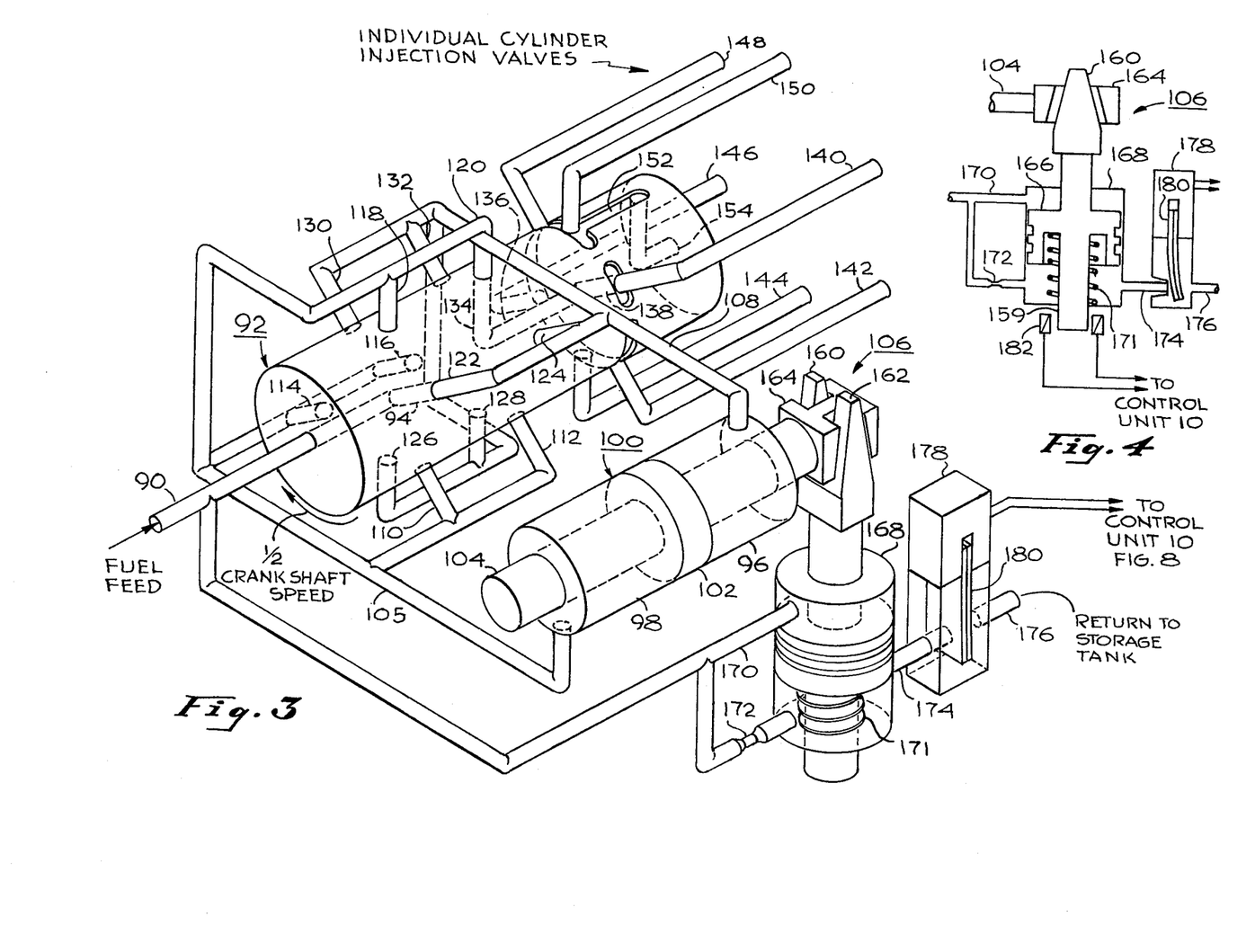
FIG. 3 is a schematic view of a fuel metering and distribution unit in accordance with this invention.
FIG. 4 is a view in section of the wedge driving device for controlling the metering shuttle in the fuel metering unit.

FIG. 3 is an isometric view of a fuel metering and distribution unit. Fuel is fed from the low pressure pump, at a pressure, for example, of 7 bars, through the tube 90, to the bore of a hollow cylinder 92, which is driven suitably from the engine crankshaft so that it rotates at half crankshaft speed. A passageway 94, which is a right-angle passageway, is formed in the cylinder 92 so that any fuel delivered at the inlet 90 is transferred by the right-angle passageway to the periphery of the cylinder 92. The rotating cylinder then can deliver, alternately, fuel to opposite ends, respectively, 96, 98, of a closed hollow cylinder 100, which contains an oscillating shuttle or plunger 102. The plunger is mounted on a shaft 104, which is attached to a shuttle control 106, which serves the function of controlling the length of the shuttle stroke.

Tubing is provided for successively delivering fuel alternately, to the opposite ends of the metering shuttle-housing 100, and also for returning this fuel back to the cylinder 92 which thereafter, as it rotates, delivers the fuel to the individual injection valves of the engine. Such tubing comprises a main tube 105 and a main tube 108, which extend from the respective ends 98, 96 of the metering shuttle to the cylinder 92, At the cylinder 92, tubing 105 has the respective tube stubs 110, 112, 114, 116, 118 and 120. Tubing 108 has the following stubs, which extend from it to the periphery of the cylinder, respectively, 122, 124, 126, 128, 130 and 132.

Together with the main tubing 105, the stub tubing 110, 114 and 118 will be successively connected to the right-angle passageway 94 for delivering fuel to the side 98 of the metering shuttle as the cylinder 92 is rotated. However, the connection of passageway 94 to the stubs of main tubing 105 occurs alternately with the connection to the stubs 122, 126 and 130, of the main tubing 108. In the drawing, stub tubing 122 is shown connected to the passageway 94, and therefore fuel is being fed over the passageway 94 through stub 122 through main tubing 108, to the end 96 of the metering shuttle.

As the shuttle 102 is moved, in response to the pressure of the fuel being received on the side 96, toward the side 98, fuel is being returned from the metering shuttle over main tubing 105 and stub tubing 112, 116 and 120 to the cylinder 92.

When main tubing 108 returns fuel to cylinder 92, it does so through tubing stubs 124, 128 and 132.

There is another passageway within the cylinder 92, which successively connects to the stub tubing returning fuel to the cylinder from the metering shuttle. This is a passageway comprising three parts. The first part 134 connects from the periphery of the cylinder 92 to the fuel delivery stubs, to the axis of the cylinder where there is a second passageway portion 136, which is connected thereto. A third passageway portion 138 connects from the central passageway 136 outward to the periphery of the cylinder again. This passageway section 138 successively connects with tubing respectively 140, 142, 144, 146, 148 and 150, as the cylinder rotates. These tubes are the ones which deliver the metered fuel to the individual injection valves for the cylinder of the engine, where the metered fuel will be stored.

In the drawing, main tubing 105 is delivering fuel from the metering shuttle, over stub 120, to passageway 134, 136, 138 which is connected to tubing 140. Tubing 140 is connected to one of the injection valves.

When the passageway 138 is not registering with the individual tubing 140 through 150, which delivers fuel to the individual cylinder injection valves, a relief groove 152 is provided which connects each of these tubes to drain tubing 154.

The foregoing description is briefly directed to the metering of the fuel and the manner in which it is distributed to the respective injection cylinders from the metering apparatus. The description that follows is directed to the control of the metering shuttle. Reference should be had to FIGS. 3 and 4 in connection with this description.

One end of the shaft 104 which carries the shuttle 102 has been previously indicated as being connected to a shuttle stroke controlling device 106. This comprises for example, a pair of spaced forklike tines, respectively 160, 162, which are in the form of a tapered wedge. Fitted between the spaced tines of the tapered wedge is an H-shaped abutment unit 164, which, as shown in the cross-sectional view of FIG. 4, has its inside edges at an angle parallel to the angle made by the tapered wedge sides and these are spaced from the tapered wedge so that as the wedge is moved downwardly, the shaft 104, together with the abutment unit, can reciprocate a greater distance than when the wedge is moved upwardly. The wedge can be moved upwardly a sufficient distance to block motion by the shaft 104.

From the foregoing it should be appreciated that the position of the wedge tines 160, 162, control the distance which the metering shuttle travels, thereby controlling the volume of fuel being metered to the engine cylinders. The more the tapered wedge is withdrawn from the H-shaped abutment unit, the larger the quantity of fuel being delivered to each of the individual cylinders. The reverse is also true.

The position of the wedge is controlled by a piston 166, which is operated within a closed cylinder 168. A spring 171, urges the piston to return the wedge to the no shuttle travel position. A feed tube respectively 170, 172, is connected to each side of the piston 168 with a constriction being in the tube 172, which is connected to the spring side of the cylinder. Also from that side of the cylinder, a tube 174 is connected to a vent to drain pressure tubing 176, through a valve 178. The valve includes, for example, a piezoelectric bimorph 180, which, in response to electrical signals from the control unit, can be made to assume a desired angle whereby the passageway between tubing 174 and 176 can range from fully open to fully closed.

A sensing unit 182 which may be electromagnetic Hall effect, a linear variable differential transformer, or an inductive sensor, is positioned at one end of an extension from the piston 166 whereby the position of the piston and thereby the position of the wedge may be sensed. Effectively, the position of the wedge determines the amplitude of travel of the metering shuttle and thus the amount of fuel being delivered to each cylinder. Therefore, the sensing unit 182 generates a signal indicative of the quantity of fuel being delivered. This signal is fed back to a circuit, shown in detail in FIG. 8, which is within the control unit 10, to be compared with the signal being applied to the bimorph. Any signal disparity is either added to or subtracted from the bimorph controlling signal.

In operation, when a control signal is applied to the piezoelectric valve, the valve moves rapidly to almost fully open position. As the wedge adopts the position where the transducer output matches the control signal, the disparity falls to zero and the valve holds an opening that creates equilibrium between the hydraulic forces on opposite sides of the piston 166 and the spring 171. It should be noted, that when flow occurs through valve 178, because of the constriction in the tubing 172, the pressure of the fuel at the top of the piston is greater than the pressure of the fuel at the bottom, which tends to drive the piston downwardly against the pressure of the spring. Thus the bimorph 180, by controlling the size of the opening to the drain, can determine whether the hydraulic pressure applied to the bottom of the piston through the tubing 172 will be equal to the pressure at the top, whereby the spring 170 will drive the wedge to the fully closed position, or with the bimorph permitting a full opening, the fuel pressure at the top of the piston will drive it fully downwardly to permit maximum fuel delivery. The positions in between maximum and minimum fuel delivery are thus determined by the bimorph position and consequently by its controlling signal.

Figures 5, 7:
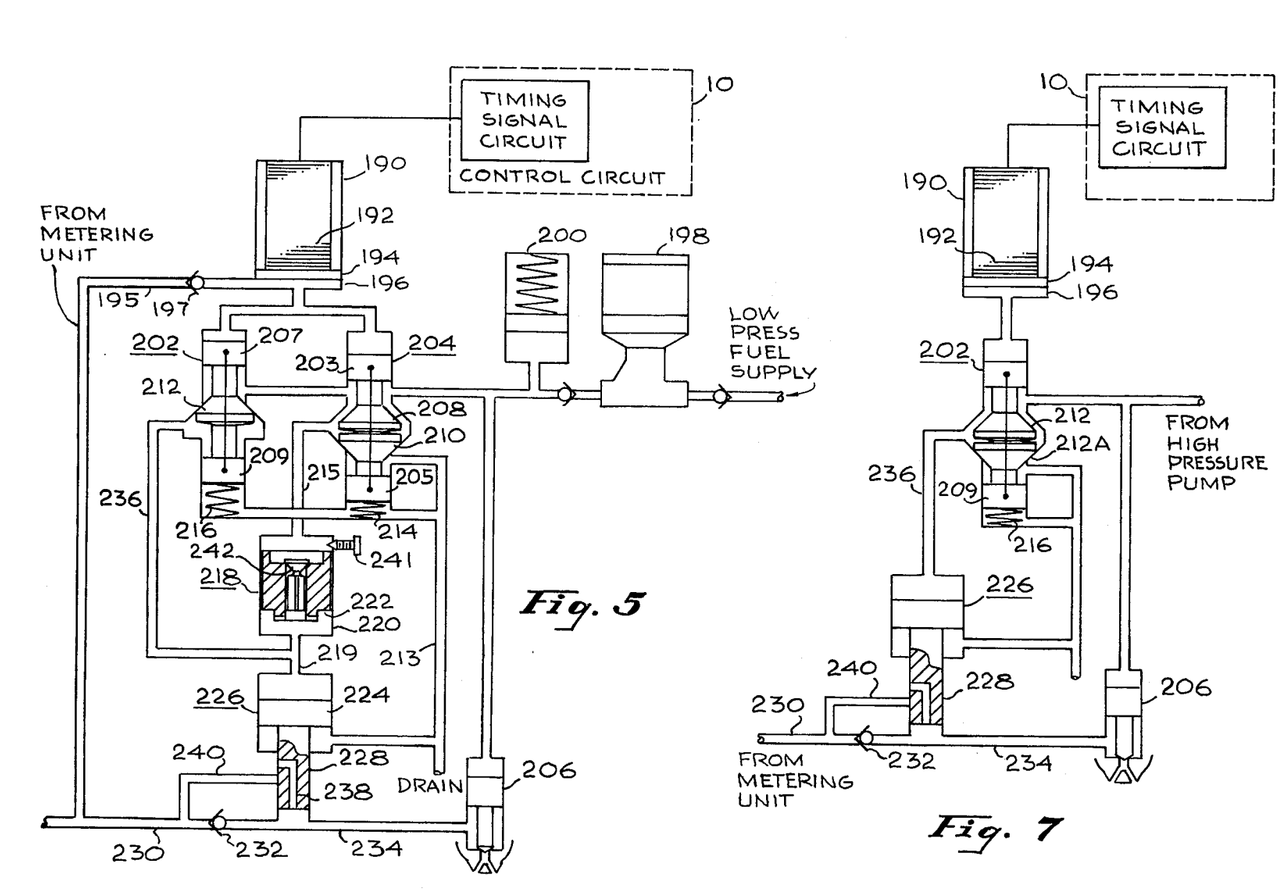
FIG. 5 is a schematic drawing of the fuel injection system for pilot and main injection, in accordance with this invention.
FIG. 7 is a schematic diagram showing a fuel injection arrangement for main injection only, in accordance with this invention.
Figure 6:
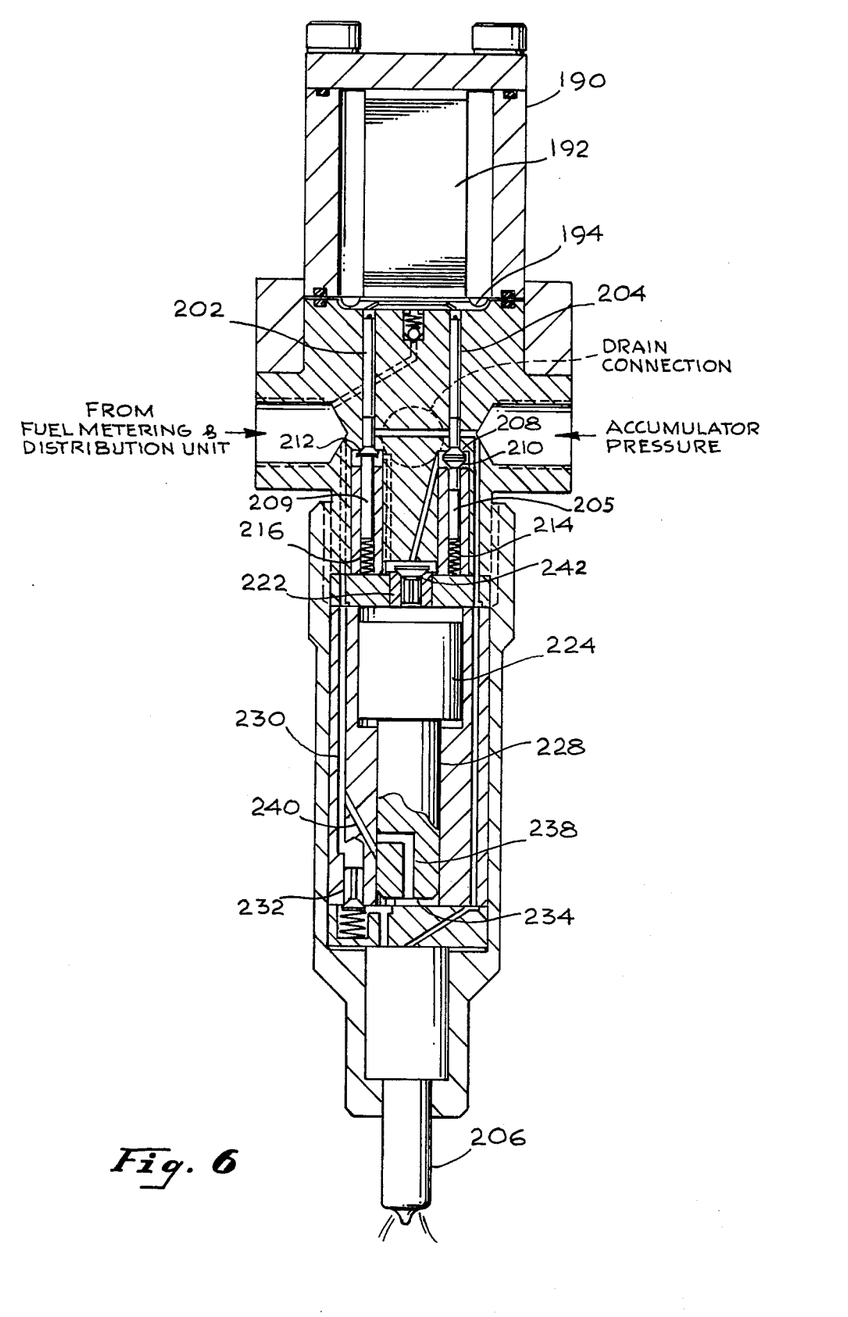
FIG. 6 is a view in section of a fuel injection structure which is schematically shown in FIG. 5.

FIG. 5 is a schematic drawing of a fuel injection arrangement for injecting pilot and main fuel into the engine cylinder. FIG. 6 is a cross-sectional view illustrating a suitable structure. They should both be considered together. Operation of the fuel injector is initiated by a valve 190, in response to control signals from the control unit 10. Effectively the valve, by way of example, comprises a stack of piezoelectric elements 192 which, in response to the signals from the control unit will cause a plunger 194, to move within a chamber 196.

Fuel under low pressure is supplied to the chamber 196 from the metering unit 16 which is described in FIG. 3 of the drawings, over a passage 195 which includes a check valve 197.

High pressure fuel is delivered from a high pressure pump 198 which may be of the type shown in FIG. 2, to an accumulator 200, to a main injection control valve 202, shown in its inoperative position, and to a pilot injection control valve 204, shown in its operative position. The high pressure fuel is also applied to an injection nozzle valve 206, to maintain it in its closed position.

It will be recognized that the function of the accumulator 200 is to maintain the high fuel pressure constant.

The pilot injection control valve 204 has two pressure balance plungers 203, 205 and valve seatings respectively 208 and 210. The main injection control valve also has two pressure balance plungers 207, 209 and has a single valve seating 212. The pilot injection control valve has a spring 214, which biases the plungers to their upward position. In the upward positions, the valves 208 and 212 block delivery of high pressure fuel to the remainder of the system. In order to effectuate pilot injection control, a first signal is applied to the pz valve 190 which causes it to move partially and not to its fullest extent. Since the spring 214 of the pilot injection control valve is made to have a lighter pressure than the spring 216 of the main injection control valve, the pilot injection control valve is moved first so that the valve seating 210 closes the lower passageway thereby closing the tubing 213 or passageway to the drain, and opening a passageway 215. The high pressure fuel then applied to this passageway actuates a pilot fuel quantity measuring device 218. This includes a chamber 220, wherein there is a plunger 222, which can be positioned by adjusting its axial clearance or by operation of an adjuster 241 so that the distance this plunger travels when it is actuated, determines the quantity of fuel which will be injected into the engine cylinder.

When the pilot plunger 222 is driven downwardly, in response to actuation of the pilot injection control valve, it applies pressure to the fluid that fills the tubing 219 connecting to the piston 224. Piston 224 is within a fuel injection pressure intensifier device 226. The piston 224 actuates a plunger 228 downwardly. Fuel was previously delivered from the fuel metering device shown in FIG. 3 through a tube 230, through a check valve 232, to a storage passageway 234 which terminates at the fuel injection nozzle 206. The plunger 228 is moved by the piston 224 downwardly on the fuel which is within the storage passageway 234. Since the surface area of the piston 224 is much greater than the area of the plunger 228 which is being brought to bear on the stored fuel, there is a multiplication of the pressure on the stored fuel which is determined, as is well known, by the ratios of the surface areas of the respective piston and plunger. By correctly determining these surface areas, the pressure applied to the stored fuel and therefore the pressure of the stored fuel is increased to a value where it exceeds the pressure being applied from the high pressure pump to the injection nozzle 206, whereby the injection nozzle is opened and the pilot fuel injection into the cylinder of the engine takes place.

After a suitable interval, which is determined by the control unit, a further signal is applied to the valve 190, in response to which piston 194 undergoes an additional displacement whereby the plunger of the main injection control valve 212 is caused to move downwardly. This opens the passageway 236 to receive high pressure fuel from the pump 198, which causes the plunger 224 to be moved still further downwardly causing the remainder of the fuel in the storage passageway 234 to be injected into the cylinder. An injection nozzle of a type described in U.S. Pat. No. 3,738,576 may be modified for use with this invention. This constitutes the main fuel injection. The plunger 228 moves downwardly until the fuel injection cutoff passageway 238 lines up with a feedback passageway 240. At this time in the engine cycle the metered fuel feed ports (shown in FIG. 3) will register with drain groove 152 allowing an unhibited passage to the relief of fuel spilled through the feedback passageway 240. This causes an immediate drop in the pressure being applied to the fuel in the storage passageway whereby the fuel injection is immediately terminated.

The fuel injection arrangement on the succeeding cylinder in the engine's firing order is then actuated in the manner described. The signal which actuated the pz valve 190 is removed whereby the springs 214, 216 can urge the plungers in the respective control valves, upwardly to their closed position. The next time that metered fuel is fed into the storage passageway 234, the pressure of the metered fuel causes plunger 228 to be driven back in the direction of its original position by a distance determined by the metered quantity of fuel. This also applies pressure to drive the pilot plunger back to its original position. A refill valve 242 within the pilot plunger will open at this time to permit fuel displaced by the filling action to be exhausted to drain.

When the timing signal is removed from the pz valve 190 the valve 210 is restored to its inoperative position by the spring 214. It then opens the passageway to the drain whereby pressure is removed from the top of the pilot plunger enabling it and the piston of the injection pressure intensifier to be easily restored in response to the pressure with which the metered fuel is delivered to the storage passageway 234.

FIG. 7 is a schematic arrangement illustrating the fuel injector when no pilot injection is required. it will be seen that essentially the system is the same as the one shown in FIG. 5, except that the pilot injection control valve and the pilot injection plunger are omitted and a double plunger respectively 212, 212A is provided for the main injection control valve instead of the single plunger as before. The purpose of the plunger 212A is to close the passageway to the drain when the injection control valve is operated. Otherwise, the system functions identically in the manner that has been described for the operation of the main injection control valve and therefore will not be redescribed. The components of the arrangement shown in FIG. 7 are given the same reference numerals as are employed in FIG. 5 since they perform the same functions. It will also be appreciated that when the piezoelectric valve 190 is actuated, it provides a full stroke for actuating the main injection control valve rather than being operated in two steps as is required for pilot and then injection control valve operation.

The portion of the control unit which provides signals to the fuel injectors is described in detail in a U.S. Pat. No. 3,575,146, entitled Fuel Injection System for Internal Combustion Engine. The system has operator inputs for load, fuel-type, and cold starting. It provides for sensor inputs for crank shaft position (which also act as a speed sensing input), engine temperature, ambient temperature and ambient pressure. It provides for plug-in programs for maximum fuel versus speed (torque-shaping) and speed governing.

The method by which these inputs are combined to give a predetermined program of maximum fuel per injection, timing of pilot injection, timing of main injection against speed, and the means for achieving automatic fuel adjustment for ambient temperature, pressure, are completely shown and described.

In the U.S. Pat. No. 3,575,146, injection into the engine cylinders is determined by an arrangement such as an electroexpansive pump. Two power supplies are provided for that pump, one known as the main injection power supply and the other is the pilot power supply. The pilot power supply output signal is determined at the factory since the quantity of pilot fuel to be injected is usually fixed. The main injection power supply signal is the variable signal, being determined in accordance with all previously indicated parameters. In the present application, the quantity of pilot fuel to be injected is determined by the setting of the pilot injection plunger in the pilot valve. The present invention uses a metering shuttle device to measure the quantity of fuel to be supplied to each cylinder with the quantity of that fuel being determined in accordance with the position of the wedge. The wedge position is determined in response to an electrical signal which is applied to a piezoelectric valve. Thus, in the present invention, the electrical signal that in the U.S. Pat. No. 3,575,146, would be applied to the main injection power supply to control the quantity of fuel which is to be injected, in the present invention is applied to the piezoelectric valve which controls shuttle position.

Figure 8:
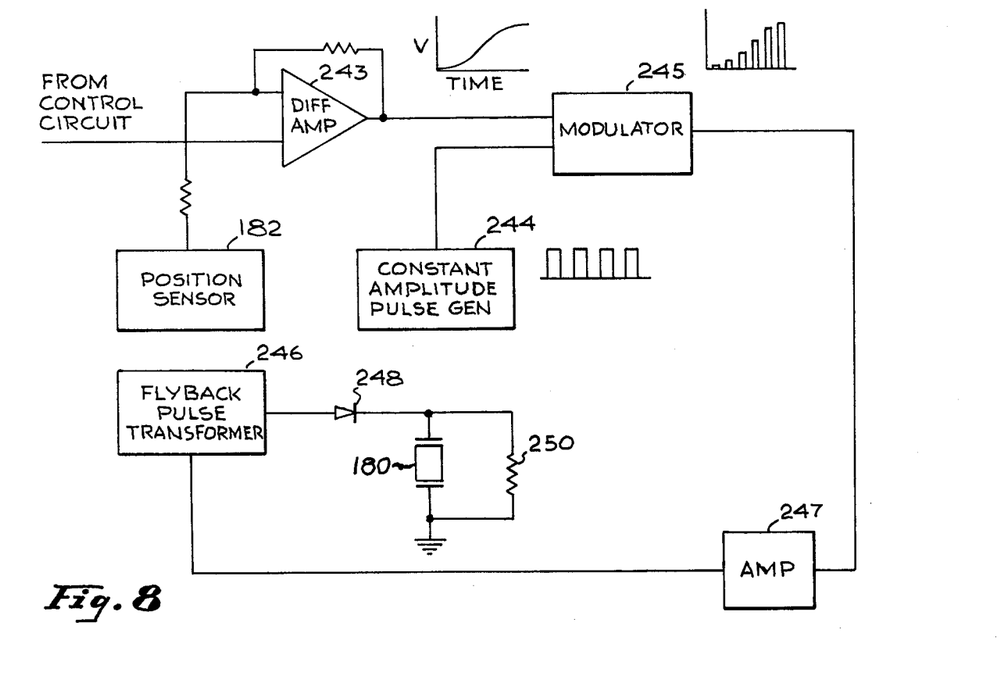
FIG. 8 is a block schematic diagram of the circuit used for controlling the piezoelectric valves used in the fuel injection system.

The electrical circuit which receives the signal for controlling the piezoelectric valve is shown in FIG. 8, which is a schematic diagram of the circuitry required. Again, it is to be understood that the electrical signal which in the patent was applied to the main injection current supply to control the quantity of fuel to be delivered during the main injection, in this invention is applied to the interface control device, shown in FIG. 8, which determines the length of the stroke of the shuttle in the fuel metering device.

FIG. 8 is a schematic drawing of the electrical drive circuit for the control device. A differential amplifier, 243, receives as one input, a signal from the control circuit indicative of the quantity of fuel which is called for by the operator's control as modified by the various other parameters which are measured to determine the correct quantity of fuel. The other input is from the position sensor 182, which is indicated in FIG. 4 as sensing the position of the shuttle travel determining wedge shaft 159. The output of the differential amplifier is a signal proportional to the difference of the two inputs. This signal is applied to a modulator 245, which also receives as its input a pulse train, at a frequency, such as 25KHz, from a constant amplitude pulse generator 244, the modulator output is a pulse train wherein the amplitude of the pulses is determined by the output from the differential amplifier 243. The output of the modulator 245 is then amplified by an amplifier 247 whose output is applied to a flyback pulse transformer 246. The output of the flyback pulse transformer is applied through a rectifying diode 248, to the bimorph piezoelectric device 180. A resistor 250, is connected in parallel with the piezoelectric device. The piezoelectric device acts as a storage capacitor for the signals applied thereto by flyback transformer 246. The resistor 250 provides a continuous drain to reduce the voltage stored by the piezoelectric device as the electrical drive is removed at some suitable removal rate.

The interface device driving circuit therefore applies pulse signals to the piezoelectric bimorph device, whose amplitude is determined by the difference in position between the voltage signal representing the desired quantity of fuel and the shuttle travel determining wedge position signal indicative of the fuel quantity being delivered. The larger the fuel demand signal from the control circuit, the bigger the signal applied to the bimorph, the more wide open will be the passage control valve and therefore the lower the wedge position and therefore the greater the travel of the metering shuttle with an increased volume of fluid being delivered. The signal delivered across the piezoelectric bimorph element will thereafter oscillate slightly about this location. The interface driving circuit effectively performs a servo operation.

Figure 9:
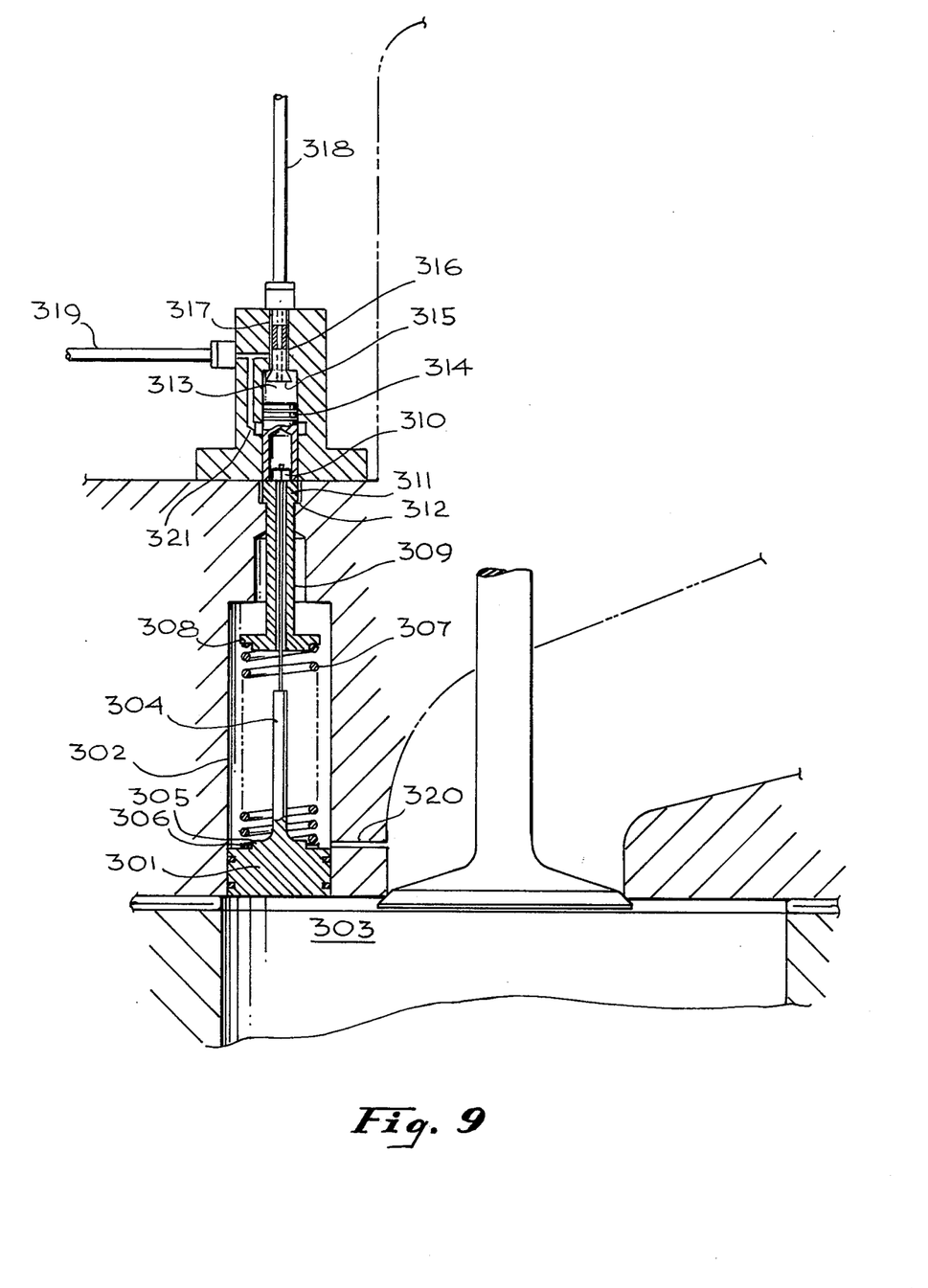
FIG. 9 is a view in section of another embodiment of a gas-driven fuel pump.

FIG. 9 shows another embodiment of a gas operated fuel pump. A piston 301 is disposed in a cylinder 302 such that the lower side of the piston is connected directly to the engine's combustion chamber 303. The upper side of the piston carries an extension rod 304 that extends through the water jacket of the engine's cylinder head. An abutment 305 on the extension rod engages, through washer 306, with a compression spring 307. A washer 308 at the upper extremity of the spring abuts a hollow plunger 309. The hollow plunger is preloaded against spring 307 by means of nut 310 which is attached to a threaded end portion of rod 304. Plunger 309 has an enlarged collar 311 which fits in a counterbore 312 in the cylinder head and limits downward movement of the complete assembly. A finely-machined bore in a second cylinder 313 carries a close fitting piston 314 that concentrically abuts the upper end of plunger 309. The lower extremity of piston 314 is counterbored to provide axial clearance over nut 310.

Cylinder 313 is mounted to the cylinder head from the exterior of the engine and may be removed without exposing the interior of the engine to dirt or moisture. A check valve 315 is mounted in the upper end of cylinder 313. Valve 315 seats on a bore 316 that is slightly larger than its guided portion 317. A fuel inlet 319 fed with fuel at low pressure, for example, 15–100 psi (1–7 bars), conducts fuel to the enlarged bore 316 so that the valve will open when pressure in the upper end of cylinder 313 is lower than the feed pressure. A conduit 318 carries pressurized fuel to an injector of the type, for example, shown in U.S. Pat. No. 3,927,652.

The device operates as follows:

When the piston of an engine operating on the compression ignition principle rises to compress air on the compression stroke, the force developed on the lower side of piston 301 urges it to move in an upward sense until it reaches the limit of travel determined by the length of cylinder 302. Force is transmitted through rod 304, spring 307, plunger 309 and piston 314 to fuel in the upper part of cylinder 313. Fuel pressure rises but, due to its low bulk compressibility, displacement of piston 314 equivalent to displacement of piston 301 is not possible, and spring 307 compresses to accommodate the difference in displacements. The area ratio between these pistons is so determined that full displacement of piston 301 is achieved at approximately one half the compression stroke of the engine and considerably in advance of normal combustion. The energy stored in spring 307 provides an accumulator effect so that a volume of fluid, under pressure determined by the spring and not by the conditions of the engine, is available to provide injection or to perform servo functions under the control of a mechanical, hydraulic or electrical valve.

When the fuel injection process is completed and the engine rotates to the end of its exhaust stroke, piston 301 falls until the spring 307 is extended to the degree permitted by nut 310. Plunger 309 falls until arrested by collar 312 and piston 314 is permitted to travel in a downward sense until it contacts plunger 309. Fuel pressure in feed line 319 causes valve 315 to open, thus refilling cylinder 313 and providing the displacing force to urge piston 314 to move downwards.

A channel 320 vents the upper side of piston 301 to the inlet port of the engine and permits any gas that leaks past the piston rings to be recycled. A relief groove 321 collects fuel that leaks down the clearance between piston 314 and cylinder 313. This groove is connected by an internal drilling to the fuel feed conduit 319.

The advantages of this fuel pump are as follows:

1. Fuel at high pressure is provided without any rugged gearing or devices. No mounting gear, cases, shafts, etc. are required, therefore, the cost is considerably lower.

2. The engine may be assembled by its manufacturer using only conventional fit, finishes and processes. In this condition it excludes dirt and moisture. The fuel pump has close tolerances and a high superfinish. This unit may be supplied by a component manufacturer and attached later. It can also be replaced easily if damaged or worn.

3. The small and limited stroke of the in-cylinder piston 301 has minimal effect on the compression ratio of the engine and may be compensated by initial design.

4. The pressure developed by the fuel pump is not variable with engine deterioration.

5. The in-cylinder piston 301 is stationary when combustion occurs. Therefore wear, thermal loading and lubrication problems all are minimized.

6. Modular construction—one cylinder can fail without affecting another.

There has accordingly been shown and described hereinabove a novel fuel injection system which permits independent control of the timing of fuel delivery and of the quantity of fuel delivered, using novel structural arrangements for accomplishing these, which permit full advantage to be taken of all of the parameters that should be considered for controlling timing and fuel injection to obtain the maximum operation of an internal combustion engine. While a specific embodiment of this invention has been shown and described, it will be understood that this is by way of illustration and not by way of limitation, since the scope and spirit of the claim is set forth in the claims appended hereto.

What is claimed is:

1. A fuel pump comprising:
   inlet passageway means communicating with said fuel chamber for supplying fuel thereto;
   outlet passageway means communicating with said fuel chamber for withdrawal of fuel therefrom;
   a first piston means reciprocally moveable within said fuel chamber in a first direction for enabling fuel to enter said fuel chamber and in a second direction, opposite said first direction, for compressing fuel for enabling it to be withdrawn from said fuel chamber, said first piston means having a first end which defines one side of said fuel chamber and a second opposite end;
   a single spring;
   control means responsive to gas pressure from a gas source for moving in said second direction when the gas pressure exceeds a selected level, said control means including an extension member adapted to come in contact with said first piston means; and
   coupling means including said single spring for mechanically coupling said first piston means to said control means, with said spring being continually in a compressed state for continuously biasing said first piston means and said control means in said second and first directions, respectively, to thereby urge said first piston means toward said extension member whereby when said gas pressure exceeds said selected level, said control means moves in said second direction and the spring urges said first piston means in said second direction to compress the fuel in said fuel chamber, and when the gas pressure is not greater than said selected level said spring biases said control means and thereby moves it in said first direction, with said first piston means following said control means in said first direction.

2. A fuel pump as recited in claim 1 wherein said control means includes:
   second walls defining a first chamber; and
   a second piston means having a first end exposable to gas pressure and a second opposite end with said spring being in contact with said second end, said second piston means being reciprocally moveable in said first chamber in said second direction toward said first piston means when the gas pressure exceeds said selected level and in said first direction when the gas pressure is not greater than said selected level, said pump further including means for limiting the travel of said first piston means in said first direction.

3. A fuel pump as recited in claim 1 wherein said coupling means extension member includes means adjustably positionable on said extension member for controlling the compression of said spring means between said plunger means and said first piston means in order to control the continuous bias said spring applies to said plunger means and to said first piston means in opposite directions.

4. A fuel pump comprising:
   first walls defining a fuel chamber;
   inlet and outlet passageways, communicating with said fuel chamber;
   plunger means, including a first end defining a moveable side of said fuel chamber, said plunger means being moveable in a first direction for enabling fuel to enter into said fuel chamber through said inlet passageway and moveable in an opposite second direction for forcing fuel to move out of said fuel chamber through said outlet passageway, said plunger means having a second end opposite said first end;
   second walls defining a piston chamber;
   a piston means reciprocally moveable in said piston chamber, said piston chamber having an open end and said piston means has a first end exposable to gas through said piston chamber open end, and an opposite second end, said piston means having an extension member extending from said second end and adapted to come in direct physical contact with said plunger means;
   a single spring having first and second opposite ends; and
   coupling means for coupling said first end of said single spring to the second end of said piston means and the second end of said single spring to the second end of said plunger means, so that the single spring is continuously compressed and continuously biases said piston means, and said plunger means in opposite directions, so that said plunger means comes in contact with said extension member of said piston means, whereby when the pressure of gas to which said piston means is exposed exceeds a selected level said piston means moves in said second direction, thereby causing said spring to move said plunger means in said second direction, and when the gas pressure is not greater than said selected level said piston means moves in said first direction and when said extension member comes in contact with said plunger means the latter is forced by said extension member to move in said first direction even though said spring biases it in said second direction.

5. A fuel pump as recited in claim 4 wherein said coupling means extension member includes means adjustably positionable on said extension member for controlling the bias applied by said spring to said plunger means and to said piston means by controlling the point of direct contact between said extension member of said piston means and said plunger means.

6. A fuel pump as recited in claim 5 wherein said plunger means comprises a first member which has a first end and an opposite second end, the latter corresponding to the second end of said plunger means, said first member being biased by said single spring at the second end thereof, said plunger means further including a second member with a first end, which corresponds to the first end of said plunger means and which defines the moveable side of said fuel chamber, and a second end, said second member being moveable in said first direction until its second end comes in contact with the first end of said first member, and when said piston means move in said second direction said spring causes said first member to move in said second direction so that said first member urges said second member to move in said second direction.

7. A fuel pump as recited in claim 4 further including third wall means defining an opening in which said plunger means is moveable in either said first or said second direction, said third wall means including means adapted to engage said plunger means at a selected section thereof in order to limit the travel of said plunger means in said first direction.

8. A fuel pump as recited in claim 4 wherein said fuel chamber comprises a first compartment with which at least said inlet passageway communicates and a second compartment in which said plunger means is reciprocally moveable, and a control valve, biasable in said second direction to enable fuel to flow from said first compartment to said second compartment only when the net pressure on said valve in said first direction is greater than the pressure in said second compartment.

9. A fuel pump as recited in claim 8 further including third wall means defining an opening in which said plunger means is moveable in either said first or said second direction, said third wall means including means adapted to engage said plunger means at a selected section thereof in order to limit the travel of said plunger means in said first direction.

10. A fuel pump as recited in claim 9 wherein said coupling means include means adjustably positionable on said extension member for controlling the bias applied by said spring to said plunger means and to said piston means by controlling the point of direct contact between said extension member of said piston means and said plunger means.

11. A fuel pump as recited in claim 9 wherein said plunger means comprises a first member which has a first end and an opposite second end, the latter corresponding to the second end of said plunger means, said first member being biased by said single spring at the second end thereof, said plunger means further including a second member with a first end, which corresponds to the first end of said plunger means and which defines the moveable side of said fuel chamber, and a second end, said second member being moveable in said first direction until its second end comes in contact with the first end of said first member, and when said piston means move in said second direction said spring causes said first member to move in said second direction so that said first member urges said second member to move in said second direction.

* * * * *